US010506011B2

(12) United States Patent
Tamagnan et al.

(10) Patent No.: US 10,506,011 B2
(45) Date of Patent: Dec. 10, 2019

(54) METHOD FOR NEGOTIATING CODECS IN IP NETWORKS

(71) Applicant: Orange, Paris (FR)

(72) Inventors: Philippe Tamagnan, Orsay (FR); Bruno Chatras, Paris (FR)

(73) Assignee: ORANGE, Paris (FR)

( * ) Notice: Subject to any disclaimer, the term of this patent is extended or adjusted under 35 U.S.C. 154(b) by 298 days.

(21) Appl. No.: 15/514,342

(22) PCT Filed: Sep. 11, 2015

(86) PCT No.: PCT/FR2015/052431
§ 371 (c)(1),
(2) Date: Mar. 24, 2017

(87) PCT Pub. No.: WO2016/046466
PCT Pub. Date: Mar. 31, 2016

(65) Prior Publication Data
US 2017/0310730 A1    Oct. 26, 2017

(30) Foreign Application Priority Data

Sep. 25, 2014 (FR) ...................................... 14 59074

(51) Int. Cl.
G06F 15/16        (2006.01)
H04L 29/06        (2006.01)

(52) U.S. Cl.
CPC ........ H04L 65/607 (2013.01); H04L 65/1006 (2013.01); H04L 65/1036 (2013.01); H04L 65/1069 (2013.01); H04L 65/80 (2013.01); H04L 69/24 (2013.01)

(58) Field of Classification Search
CPC ............... H04L 65/607; H04L 65/1006; H04L 65/1069; H04L 69/24
USPC ........ 709/217–219, 227–229, 202–203, 246, 709/249
See application file for complete search history.

(56) References Cited

U.S. PATENT DOCUMENTS

| | | | | |
|---|---|---|---|---|
| 7,602,723 | B2 * | 10/2009 | Mandato | H04L 29/06 370/236 |
| 8,165,070 | B2 * | 4/2012 | Salminen | H04L 63/08 370/328 |
| 8,817,617 | B2 * | 8/2014 | Hellwig | H04L 5/1438 370/231 |
| 8,948,186 | B2 * | 2/2015 | Telikepalli | H04L 65/1069 709/226 |
| 2008/0288643 | A1 * | 11/2008 | Suotula | H04L 65/1006 709/227 |
| 2009/0252149 | A1 * | 10/2009 | Zhu | H04L 65/1069 370/352 |
| 2012/0044931 | A1 | 2/2012 | Harper et al. | |
| 2012/0169825 | A1 * | 7/2012 | Patel | H04L 65/1063 348/14.01 |
| 2014/0362764 | A1 * | 12/2014 | Aksu | H04L 69/24 370/328 |
| 2015/0131652 | A1 * | 5/2015 | Telikepalli | H04L 65/1006 370/352 |

FOREIGN PATENT DOCUMENTS

| | | |
|---|---|---|
| WO | WO 2007/035572 | 3/2007 |
| WO | WO 2008/083470 | 7/2008 |

OTHER PUBLICATIONS

International Search Report dated Dec. 12, 2015 for International Application No. PCT/FR2015/052431 filed Sep. 11, 2015, 5 pages.
Written Opinion dated Dec. 12, 2015 for International Application No. PCT/FR2015/052431 filed Sep. 11, 2015, 7 pages.

* cited by examiner

Primary Examiner — Bharat Barot
(74) Attorney, Agent, or Firm — Knobbe, Martens, Olson & Bear, LLP

(57) ABSTRACT

A codec negotiation method may include issuance by a first terminal, belonging to a first IP domain/network, of an offer message specifying, a list of codecs referred which said first terminal is capable of using for communicating with a second terminal, belonging to a second IP domain/network. The offer may be intercepted by a transit device situated on the signaling path between the first and second domains/networks. The transit device may determine a revised offer, and send the revised offer to the second terminal. The second terminal may determine a response including a list of more than one codecs that are contained in the revised offer and that the second terminal is capable of using, and sends the response to the transit device. The transit device may determine a provisional revised response, so as to comply with a certain priority criterion selected by the operators of the domains/networks in question.

12 Claims, No Drawings

METHOD FOR NEGOTIATING CODECS IN IP NETWORKS

RELATED APPLICATIONS

This application is the U.S. National Phase of Application No. PCT/FR2015/052431 entitled "METHOD FOR NEGOTIATING CODECS IN IP NETWORKS" filed Sep. 11, 2015, which designated the United States, and which claims the benefit of French Application No. 1459074 filed Sep. 25, 2014.

The present invention relates to Internet protocol (IP) type networks that are suitable for using advanced session control protocols for setting up one or more media streams between users.

More particularly, the present invention relates to "coding" media streams. The way media streams are coded enables them to be conveyed with greater or lesser degrees of "compression"; it should be recalled that data compression is the computer operation that consists in using an appropriate algorithm to transform an original sequence of bits into a shorter sequence of bits that is suitable, after performing an inverse operation known as "decompression", for restoring the original sequence of bits with little loss, or indeed with no loss. Terminals make use of coder-decoders or "codecs" that preform coding/decoding algorithms on media data being transmitted or received. Conventional codecs Include in particular audio codecs (e.g. G.711, G.723.1 and G.729) and video codecs (e.g. H.261 and H.263). Depending on its computational power and on the circumstances of its use, a given terminal is generally capable of making use of only a certain subset of existing codecs.

It should also be recalled that IP networks enable conversation data to be conveyed such as "voice over IP", "content sharing", "presence", or "instant messaging". In such networks, communication services can identify physical or virtual resources by means of strings of characters, e.g. uniform resource identifiers (URIs). The syntax for URIs is defined in the Internet engineering task force (IETF) document RFC 3986; knowing the URI of a resource makes it possible to obtain the IP address of a piece of network equipment belonging to the operator managing the resource, or of a piece of equipment connected to that network.

By way of example, such pieces of equipment may be a fixed or mobile terminal, or a residential or business gateway, or indeed a network operator's voice gateway that generally connects a large number of analog or integrated services digital network (ISDN) lines such as a digital subscriber line access multiplexer (DSLAM) with session initiation protocol (SIP), i.e. a device that collects the digital subscriber line (DSL) data traffic passing over a certain number of telephone lines. For reasons of concision, the generic term "user terminal" or even "terminal" for short is used below to cover these various pieces of equipment.

Conventional advanced session control protocols, such as the H.323 and SIP/SDP protocols, make use of so-called "signalling" messages, which are messages enabling a terminal to request a connection with another terminal, or also messages signalling that a telephone line is busy, or signalling that a called telephone is ringing, or indeed signalling that such and such a telephone is connected to the network and can be joined in such and such a manner. When a client who is registered with a network using an advanced session control protocol seeks to benefit from a multimedia service made available by the network, the client sends a signalling message to the network specifying the request.

The H.323 recommendation (cf. "Wikipedia" on-line encyclopedia) combines a set of protocols for communicating voice, images, and data over IP. These protocols have been developed by the International Telecommunication Union's telecommunication standardization sector (ITU-T). These protocols may be grouped together in three categories: signalling, transporting information, and negotiating codecs.

The SIP protocol is defined by the IETF in document RFC 3261. This protocol enables multimedia sessions to be set up, modified, and terminated in a network using the IP protocol. Communication resources are identified therein either by "SIP-URIs" as defined in document RFC 3261, or by "tel-URIs" as defined in the IETF's document RFC 3966; an SIP-URI has the form "user@host" (e.g. alice@domain1), where the "host" portion identifies the network on which a user represented by the "user" portion possesses an account to a resource constituted by a service made available to the user by the network; a tel-URI is of the form "tel:telephone_number" (e.g., tel:+336123456789).

The SIP protocol is used in particular in IP multimedia subsystem (IMS) type infrastructures. The IMS is defined by the third generation partnership project (3GPP) standardization organization. It is a network architecture that was initially introduced for mobile networks, and has subsequently been extended to other accesses, including fixed accesses using xDSL technology. This architecture enables multimedia sessions to be set up dynamically and controlled between two clients, and it also makes it possible to reserve resources in the network for transporting multimedia streams. By means of this architecture, network operators can conveniently apply a management policy, deliver a predetermined quality of service (QoS), and calculate the amount for billing clients. At present, the IMS makes it possible to access services of telephony, videophone, presence, and instant messaging types, and it also manages interaction between them.

The standards relating to setting up calls and using codecs in IMS networks are defined in the following 3GPP specifications: TS 23.228, TS 24.229, and TS 26.114.

The session description protocol (SDP), which is defined in the IETF's document RFC 4566 and which is Implemented in SIP messages, is used for negotiating codecs. IETF document RFC 3264 recommends ways of carrying out such negotiation.

In certain systems, when a terminal of a first network issues a request to open a session, that so-called "calling" terminal issues at least one signalling message containing information about the set of codecs that it proposes for setting up a multimedia session with a so-called "called" terminal of a second network (which may optionally be identical with the first network); more precisely, the calling terminal proposes one or more codecs for each type of envisaged media stream (audio, video, etc.). In other systems, conversely, it is the called terminal that makes the initial proposal for codecs.

Conventionally, prior to setting up communication between two given terminals situated in different IP domains, a "session description" procedure is performed, i.e. codecs are negotiated and selected, which procedure comprises the following steps:

1) one of the two terminals, referred to below as Ta and belonging to a domain/network A, issues at least one message specifying a list of codecs referred to as an "offer" Oa, which the terminal Ta is technically capable of using for communicating with the other terminal, referred to below as Tb and belonging to a domain/network B;

2) the message is intercepted by a transit device, referred to below as E, lying between the two domains/networks; by way of example, the transit device E may be a session border controller (SBC), or in IMS networks it may be a interconnection border control function (IBCF) acting in the signalling plane coupled to a transition gateway (TrGW), also known as a border gateway (BGW) acting in the media plane and serving to translate IP addresses, to protect the media plane, and to perform transcoding;

3) the transit device E determines a list of codecs referred to as the "revised offer" Ob on the basis of at least of the offer Oa;

4) the transit device E sends the revised offer Ob to the terminal Tb;

5) the terminal Tb determines a list of codecs referred to as the "response" Rb, containing at least some of the codecs that are both contained in the revised offer Ob and also such that the terminal Tb is technically capable of using them;

6) from at least the response Rb, the transit device E determines a list of codecs referred to as the "revised response" Ra by selecting at least some of the codecs contained in the offer Oa; and 7) the transit device E sends the revised response Ra to the terminal Ta.

Unfortunately, selecting an optimum pair of codecs (one for the terminal Ta and other for the terminal Tb) comes up against the following technical problem: even though, conventionally, the transit device E "knows" (by configuration) a list of codecs used by the types of terminals of domain A as a whole, and a list of codecs usable by the types of terminal of domain B as a whole, the transit device E does not know the list of codecs that are usable at the time the communication is set up by the terminals Ta and Tb in question; unfortunately, the number of codecs pairs that are possible a priori is high (up to several tens).

To solve this problem, in the prior art:

during above step 3), in order to construct the revised offer Ob, the transit device E merely takes the offer Oa and, where appropriate, adds thereto one or more codecs that are usable by the types of terminals of domain B that are not capable of using any of the codecs contained in the offer Oa; it should be observed in this respect that when a communication is set up between two terminals using different codecs for this communication, then the transit device E (or an associated device) needs to perform a kind of translation, referred to as "transcoding"; and during above step 6), in order to construct the revised response Ra, the transit device E selects the first codec in the offset Oa that is identical to a codec contained in the response Rb, if such a codec exists, or by default it selects the first codec in the offer Oa.

This is how conventional codec negotiation methods attempt to avoid transcoding; transcoding has the particular drawback of consuming computation time (CPU) in the transit device E (or the associated device).

Unfortunately, those conventional methods have a drawback of not being suitable for taking account of certain quality of service (QoS) criteria for the communication, as desired by at least one network operator for all of its subscribers, or for which at least one network operator has a formal engagement with the subscriber in question, i.e. a service level agreement. For example, one quality of service criterion is the "definition" (i.e. image, sound, or video quality) made available by the codecs used for the communication: specifically, certain codecs, such as the G.722 codec for fixed terminals or the adaptive multi-rate-wide band (AMR_WB) codec for mobile terminals offer a high definition (HD) that is high in comparison with the definition of low definition (LD) codecs such as the G.711 or G.729 codecs for fixed terminals or the adaptive multi-rate (AMR) codec for mobile terminals, it being understood that it is possible to have HD communication only if the codec used by the terminal Ta and the codec used by the terminal Tb are both HD codecs.

In particular, a drawback of conventional methods is that they always avoid transcoding whenever that is possible, i.e. whenever there exists a codec in common between the offer Oa and the response Ob, whereas it is possible in certain circumstances to improve the QoS by transcoding, even if that is at the cost of extra load on the transit device E.

The present invention thus relates to a codec negotiation method comprising the following steps:

1) a terminal, referred to as a "first" terminal, belonging to a first IP domain/network, issues at least one message specifying, for a given type of media stream, a list of codecs, referred to as an "offer" Oa, which said first terminal is capable of using for communicating with another terminal, referred to as a "second" terminal, belonging to a second IP domain/network;

2) said message is intercepted by a transit device situated on the signalling path between said first and second domains/networks;

3) the transit device determines a list of codecs, referred to as the revised offer Ob, from at least said offer Oa;

4) the transit device sends said revised offer Ob to said second terminal;

5) the second terminal determines a list of codecs, referred to as a "response":

$$Rb=\{Cb(1),Cb(2),\ldots,Cb(n))\}$$

comprising n≥1 codecs that are firstly contained in the revised offer Ob and secondly such that the second terminal is capable of using them, and sends said response Rb to the transit device; and 6) from said response Rb, the transit device determines a list of codecs, referred to as the "provisional revised response" R'a.

Said method is remarkable in that it comprises a prior step during which a priority list is configured that comprises triplets, each constituted by:

a codec Ca usable by a terminal of the first domain/network;

a codec Cb usable by a terminal of the second domain/network; and a degree of priority associated with this pair of codecs (Ca, Cb); and in that said provisional revised response is:

$$R'a=\{Ca(1),Ca(2),\ldots,Ca(n))\}$$

where the codec Ca(i), where i=1,2, . . . , n, is a codec that, in association with the codec Cb(i) of the response Rb, offers the highest degree of priority from among the codecs of the offer Oa.

It may be observed that said second domain/network may optionally be identical to said first domain/network.

It should also be observed that the present invention relates specifically to codecs as contrasted to pseudo-codecs (where a pseudo-codec, e.g. as defined in IETF RFC 4733, is a device serving to identify telephone key signals and the tones that are issued by pieces of network equipment). The invention is compatible with any addition or removal of a pseudo-codec performed in any of the above-mentioned list of codecs.

The transit device thus ensures that regardless of the codec Cb(i) used by the second terminal in a communication with the first terminal, the codec Ca(i) that is used by the first terminal offers a maximum degree of priority from the set of pairs including the codec Cb(i).

By means of these provisions, the procedure for selecting codecs prior to setting up a communication between two terminals as performed by a transit device situated on the signalling path between the two terminals, can comply with a certain priority criterion selected by the operators of the domains/networks in question, and can also anticipate concerning the capacity of the transit device to handle the selected codecs in terms of processing or calculation.

According to particular characteristics, said method comprises a step during which the transit device sends to said first terminal a list of codecs, referred to as the "revised response" Ra, comprising said at least provisional revised response R'a, or the first codec of said provisional revised response R'a.

By way of example, in order to construct the revised response Ra, it is possible to add to the codecs of R'a codecs that are not included in the offer Oa (as provided for in above-mentioned RFC 3264).

By means of these provisions, the network operators can apply the invention in compliance with the policy of their choosing concerning the content of the revised response Ra.

According to other particular characteristics, during said step 3), the transit device performs the following substeps:

a) for each codec Ca of the offer Oa, determining one or more codecs Cb usable by a terminal of the second domain/network, and determining the degree of priority associated with the or each pair formed by said codecs Ca of the offer Oa and the or each codec Cb usable by a terminal of the second domain/network;

b) determining for each of the codecs Cb determined during substep a), a maximum degree of priority from among the associated degrees of priority determined during said substep a), and selecting this maximum degree of priority in association with the codec Cb, and c) forming a revised offer Ob comprising the codecs Cb determined during the substep a) ordered by decreasing values of the associated degree of priority as selected during substep b).

By means of these provisions, the transit device favors the first terminal selecting, for the purpose of communication with the second terminal, the codec Ca(i) that provides the maximum degree of priority from among the codecs contained in the offer Oa.

Correspondingly, the invention also provides a transit device situated on the signalling path between a first IP domain/network and a second IP domain/network. Said transit device is remarkable in that it comprises means for:

intercepting a message issued by a terminal, referred to as a "first" terminal, belonging to said first domain/network, said message specifying, for a given type of media stream, a list of codecs, referred to as an "offer" Oa, that the first terminal proposes using for communicating with a terminal, referred to as the "second" terminal, belonging to said second domain/network;

determining a list of codecs, referred to as the "revised offer" Ob, at least from said offer Oa, and sending said revised offer Ob to said second terminal;

receiving from the second terminal a list of codecs, referred to as a response:

$$Rb=\{Cb(1),Cb(2),\ldots,Cb(n))\}$$

and from said response Rb, determining a list of codecs, referred to as a "provisional revised response" R'a;

and in that it further comprises means for:

taking account of a priority list comprising triplets each constituted by:

a codec Ca usable by a terminal of the first domain/network;

a codec Cb usable by a terminal of the second domain/network; and a degree of priority associated with this pair of codecs (Ca, Cb); and in that said provisional revised response is:

$$R'a=\{Ca(1),Ca(2),\ldots,Ca(n))\}$$

where the codec Ca(i), where i=1,2, . . . , n, is a codec that, in association with the codec Cb(i) of the response Rb, offers the highest degree of priority from among the codecs of the offer Oa.

According to particular characteristics, said transit device further comprises means for sending to said first terminal a list of codecs, referred to as the revised response Ra, comprising said at least provisional revised response R'a, or the first codec of said provisional revised response R'a.

According to particular characteristics, said transit device further comprises means for:

determining, for each codec Ca of the offer Oa, the or each codec Cb that is usable by a terminal of the second domain/network, and determining the degree of priority associated with the or each pair formed by the codecs Ca of the offer Oa and the or each codec Cb usable by a terminal of the second domain;

determining, for each of the codecs Cb as determined in this way, the maximum degree of priority from among the associated degrees of priority as determined in this way, and selecting this maximum degree of priority in association with the codec Cb; and forming a revised offer Ob comprising the codecs Cb as determined in this way ordered by decreasing value of the associated degree of priority as selected in this way.

The advantages made available by these devices are essentially the same as those made available by the corresponding methods and set out briefly above.

It should be observed that it is possible to make these devices in the context of software instructions and/or in the context of electronic circuits.

The invention also provides a computer program downloadable from a communications network and/or stored on a computer-readable medium and/or executable by a microprocessor. The computer program is remarkable in that it comprises instructions for executing steps of a codec negotiation method set out briefly above when it is executed on a computer.

The advantages made available by the computer program are essentially the same as those made available by said method.

Other aspects and advantages of the invention appear on reading the following detailed description of particular embodiments given as non-limiting examples.

By way of example, consideration is given to two domains (or networks) A and B that are interconnected via a transit device E. The operator of the transit device E configures it on the basis of the following estimates:

the first domain A has two types of terminal, namely:

a first type that accepts G.711 codec; and a second type that accepts the AMR_WB and G.711 codecs; and the second domain B has five types of terminal, namely:
a first type accepting the G.722 codec;
a second type accepting the G.711 codec;
a third type accepting the G.722 codec and the G.711 codec;
a fourth type accepting the G.722 codec and the G.729 codec;
a fifth type accepting the AMR_WB codec and the G.729 codec; and
a sixth type accepting the G.729 codec.

According to the invention, the operators of the domains A and B act together to define a "priority list", referred to below as PL, made up of triplets comprising:
a degree of priority;
a codec usable by at least one type of terminal in domain A; and
a codec usable by at least one type of terminal in domain B.

This priority list PL is accessible to a transit device E situated on the signalling path between the domains A and B.

A first implementation of the method of the invention for negotiating codecs is described below.

In this implementation, it is assumed that in compliance with a prior agreement between the operators of the domains A and B, priority is an increasing function of the definition (i.e. the technical quality) of the media stream. In this respect, it should be recalled that the G.722 and AMR_WB codecs are high definition (HD) codecs, while the AMR, G.711, and G.729 codecs are low definition (LD) codecs.

For any codec Ca usable by at least one terminal of the first domain A, and any codec Cb usable by at least one terminal of the second domain B, a priority scale PS is defined, which may by way of example be as follows:
degree=5 if Cb is identical to Ca, and HD;
degree=4 if Cb is different from Ca, but both are HD;
degree=3 if Cb is identical to Ca, and LD;
degree=2 if Cb is different from Ca, but both are LD; and
degree=1 if Cb is different from Ca, with one of them HD and the other LD.

Priority is thus given to communications that are high definition (broadband) from end to end. Furthermore, transcoding is avoided between a high definition (broadband) codec and a low definition (narrow band) codec, since it is assumed (at least for the purposes of the present example) that HD-LD transcoding requires more CPU power than LD-LD transcoding.

In the present example, given the codecs that can actually be used by at least one terminal of the first domain A and the codecs that can actually be used by at least one terminal of the second domain B, this priority scale PS is used to determine the following priority list:

| degree of priority | codec A | codec B |
|---|---|---|
| 5 | AMR_WB | AMR_WB |
| 4 | AMR_WB | G.722 |
| 3 | G.711 | G.711 |
| 2 | G.711 | G.729 |
| 1 | AMR_WB | G.711 |
| 1 | AMR_WB | G.729 |
| 1 | G.711 | G.722 |
| 1 | G.711 | AMR_WB |

During a step S1, a terminal Ta belonging to the domain A issues a message specifying the following offer:

Oa={AMR_WB,G.711} in which the order of the codecs expresses the preferences of the terminal Ta.

During a step S2, said message is intercepted by the transit device E.

In the prior art, the transit device E then forms a revised offer Ob by adding to the end of the list Oa the codecs that can be used in the set of terminals in the domain B and not included in the list Oa:

Ob={AMR_WB,G.711 G.722,G.729} and it does this in particular in order to take account of the that the first and fourth types of terminal in domain B do not accept any of the codecs proposed by the terminal Ta in its offer Oa (i.e. AMR_WB and G.711). However this would lead to:
a G.711-G.711 (i.e. LD-LD) communication between Ta and a terminal Tb of the third type; or
AMR_WB-G.729, (i.e. HD-LD) transcoding between Ta and a terminal Tb of the sixth type.

In contrast, in the present implementation, it is desired to give precedence to HD-HD communications, and to avoid HD-LD transcoding.

During a step S3, the transit device E determines the revised offer Ob in compliance with the following procedure.

The list Oa is scanned sequentially. For each codec Ca in Oa, the transit device E filters the above priority list PL by retaining only the triplets that contain Ca as the first term.

Thus, since Oa={AMR_WB, G.711}:
for the first codec (AMR_WB), the sublist $PL_1$ that is obtained is as follows:

| degree of priority | codec A | codec B |
|---|---|---|
| 5 | AMR_WB | AMR_WB |
| 4 | AMR_WB | G.722 |
| 1 | AMR_WB | G.711 |
| 1 | AMR_WB | G.729 | for the second codec (G.711), the sublist $PL_2$ that is obtained is:

| degree of priority | codec A | codec B |
|---|---|---|
| 3 | G.711 | G.711 |
| 2 | G.711 | G.729 |
| 1 | G.711 | G.722 |
| 1 | G.711 | AMR_WB |

Thereafter, the sublists $PL_1$ and $PL_2$ are concatenated:

| degree of priority | codec A | codec B |
|---|---|---|
| 5 | AMR_WB | AMR_WB |
| 4 | AMR_WB | G.722 |
| 1 | AMR_WB | G.711 |
| 1 | AMR_WB | G.729 |
| 3 | G.711 | G.711 |
| 2 | G.711 | G.729 |
| 1 | G.711 | G.722 |
| 1 | G.711 | AMR_WB |

Thereafter, the column corresponding to codec A is eliminated:

| degree of priority | codec B |
|---|---|
| 5 | AMR_WB |
| 4 | G.722 |
| 1 | G.711 |
| 1 | G.729 |
| 3 | G.711 |
| 2 | G.729 |
| 1 | G.722 |
| 1 | AMR_WB |

Finally, for each codec, only the highest degree of priority is retained, i.e. the list is ordered by decreasing priority:

| degree of priority | codec B |
|---|---|
| 5 | AMR_WB |
| 4 | G.722 |
| 3 | G.711 |
| 2 | G.729 |

The transit device E thus obtains the revised offer:
Ob={AMR_WB, G.722, G.711, G.729}

During a step S4, the transit device E sends the revised offer Ob to the terminal Tb.

During a step S5, the terminal Tb determines a response Rb by selecting from the revised offer Ob the codec(s) that it accepts. It should be observed that in certain systems (e.g. IMS networks), standards recommend that the response Rb contains only one codec per type of media stream. When the response Rb may contain a plurality of codecs, it preferably complies with the order of the codecs contained in the revised offer Ob.

In the present implementation, where the revised offer is:

Ob={AMR_WB,G.722,G.711,G.729}.

and where the response Rb may contain a plurality of codecs, the terminal Tb, depending on its type, produces the following response:
first type: Rb={G.722};
second type: Rb={G.711};
third type: Rb={G.722, G.711};
fourth type: Rb={G.722, G.729};
fifth type: Rb={AMR_WB, G.729}; and
sixth type: Rb={G.729}.

The terminal Tb then sends the response Rb to the transit device E.

During a step S6, the transit device E uses the priority list PL once again to obtain a "provisional revised response" R'a.

To do this, the transit device E scans the response Rb and pairs each codec contained in the response Rb with a codec contained
In the offer Oa, and does so in such a manner as to maximize the degree of priority.

Thus, depending on the type of the terminal Tb, the transit device E obtains:
first type: Rb={G.722}, R'a={AMR_WB} (maximum priority 4);
second type: Rb={G.711}, R'a={G.711} (maximum priority 3);
third type: Rb={G.722, G.711}, R'a={AMR_WB, G711} (maximum priorities 4 and 3);
fourth type: Rb={G.722, G729}, R'a={AMR_WB, G.711} (maximum priorities 4 and 2);
fifth type: Rb={AMR_WB, G.729}, R'a={AMR_WB, G.711} (maximum priorities 5 and 2); and
sixth type: Rb={G.729}, R'a={G.711} (maximum priority 2).

It can be seen from this example that the provisional revised response R'a may comprise a plurality of codecs.

Finally, during a step S7, the transit device E obtains the (final) "revised response" Ra at least from the provisional revised response R'a, and it sends this revised response Ra to the terminal Ta.

For example, in a first variant, Ra is merely identical to R'a. In this first variant, and depending on the type of the terminal Tb, the transit device E obtains:
first type: Rb={G.722}, Ra={AMR_WB};
second type: Rb={G.711}, Ra={G.711};
third type: Rb={G.722, G.711}, Ra={AMR_WB, G.711};
fourth type: Rb={G.722, G729}, Ra={AMR_WB, G.711};
fifth type: Rb={AMR_WB, G.729}, Ra={AMR_WB, G.711}; and
sixth type: Rb={G.729}, Ra={G.711}.

In a second variant, R'a is filtered so as to retain only its first codec. This variant is particularly useful when the domain A authorizes only one codec in Ra. In this second variant, and depending on the type of the terminal Tb, the transit device E obtains:
first type: Rb={G.722}, Ra={AMR_WB};
second type: Rb={G.711}, Ra={G.711};
third type: Rb={G.722, . . . }, Ra={AMR_WB};
fourth type: Rb={G.722, . . . }, Ra={AMR_WB};
fifth type: Rb={AMR_WB, . . . }, Ra={AMR_WB}; and
sixth type: Rb={G.729}, Ra={G.711}.
Other variants are naturally possible.
It should be recalled that the initial offer from Ta was:

Oa={AMR_WB,G.711}

In the above example, it can be seen that for a terminal Tb of the third type, HD-HD communication is preferred (AMR_WB transcoded into G.722) over LD-LD communication (G.711-G.711) of the prior art.

In a second implementation of the invention, account is also taken of the current load on the transit device E (i.e. the load during the period in which codec negotiation is taking place). It should be recalled that the "load" of a device represents the active fraction of the total resources of that device; in particular, the "load" of a processor is the fraction of its nominal power that is being used by the processor at the instant in question.

In this implementation, it is assumed that the transit device (or an associated network system) is capable:
of determining its own load; and
of determining the range in which the load is situated from among a predetermined series of ranges (that are disjoint and that all lie in the range [0,1]).

It is also assumed that in compliance with a prior agreement between the operators of the domains A and B, a plurality of priority scales $PS^1$, $PS^2$, . . . , $PS^m$ have been determined (instead of only one), each of these priority scales $PS^c$, where c=1, 2, . . . , m being associated respectively with a $c^{th}$ load level, i.e. a respective range $I^c$ of values for the load of the transit device E. For example, the range $I^1$ represents a low load, the range $I^2$ a medium load, the range $I^3$ a heavy load, and the range $I^4$ a very heavy load. These priority scales are such that the greater the load on the transit device E, the more attempts are made to avoid transcoding (which is greedy in terms of computation), by giving a low degree of priority to such transcoding. Certain kinds of transcoding can even be voluntarily banned (zero degree of priority) in the event of a very high load.

Given the codecs that are actually usable by at least one terminal of the first domain A, and the codecs that are actually usable by at least one terminal in the second domain G, respective priority lists $PL^1, PL^2, \ldots, PL^m$ are determined in compliance with these respective priority scales $PS^1, PS^2, \ldots, PS^m$.

For example, in a high load situation (load belonging to the range $I^3$, say), it would be possible to have the following priority scales $PS^3$:
- degree=5 if Cb identical to Ca, and HD;
- degree=4 if Cb identical to Ca, and both LD;
- degree=3 if Cb different from Ca, but both LD;
- degree=2 if Cb different from Ca, but both HD; and
- degree=1 if Cb different from Ca, with one HD and the other LD.

This gives priority to high definition (broadband) end-to-end communications, while avoiding transcoding if it involves a high definition (broadband) codec.

The transit device E consults the following list $PL^3$ satisfying this priority scale $PS^3$:

| degree of priority | codec A | codec B |
| --- | --- | --- |
| 5 | AMR_WB | AMR_WB |
| 4 | G.711 | G.711 |
| 3 | G.711 | G.729 |
| 2 | AMR_WB | G.722 |
| 1 | AMR_WB | G.711 |
| 1 | AMR_WB | G.729 |
| 1 | G.711 | G.722 |
| 1 | G.711 | AMR_WB |

The present implementation begins with steps S'1 and S'2 that are respectively identical to steps S1 and S2 of the first implementation.

However thereafter, during a step S'3, the transit device E filters the above priority list $PL^3$ to produce two lists $PL^3_1$ and $PL^3_2$ which, when concatenated, gives the following list:

| degree of priority | codec A | codec B |
| --- | --- | --- |
| 5 | AMR_WB | AMR_WB |
| 2 | AMR_WB | G.722 |
| 1 | AMR_WB | G.711 |
| 1 | AMR_WB | G.729 |
| 4 | G.711 | G.711 |
| 3 | G.711 | G.729 |
| 1 | G.711 | G.722 |
| 1 | G.711 | AMR_WB |

Thereafter, after filtering and ordering, the transit device E constructs the following list:

| degree of priority | codec B |
| --- | --- |
| 5 | AMR_WB |
| 4 | G.711 |
| 3 | G.729 |
| 2 | G.722 |

In other words, in the present implementation, the revised offer is:

Ob={AMR_WB,G.711,G.729,G.722}

In this revised offer, all of the codecs necessary for the domain B are present, but they are given priorities that are different from those associated with the first implementation, since the codec G.722 is now relegated to the last position.

During a step S'4, the transit device E sends the revised offer Ob to the terminal Tb.

During a step S'5, the terminal Tb determines a response Rb by selecting from the revised offer Ob the codec(s) that it accepts. In the present implementation, in which the revised offer is:

Ob={AMR_WB,G.711,G.729,G.722} and in which the response Rb may contain a plurality of codecs, the terminal Tb, depending on its type, produces the following response:
- first type: Rb={G.722};
- second type: Rb={G.711};
- third type: Rb={G.711, G.722};
- fourth type: Rb={G.729, G.722};
- fifth type: Rb={AMR_WB, G.729}; and
- sixth type: Rb={G.729}.

Thereafter, the terminal Tb sends the response Rb to the transit device E.

During a step S'6, the transit device E uses the list $PL^3$ once more to obtain the provisional revised response R'a.

To do this, the transit device E scans the response Rb, and couples each codec contained in the response Rb with a codec contained in the offer Oa, and does so in such a manner as to maximize the degree of priority.

Thus, depending on the type of the terminal Tb, the transit device E obtains:
- first type: Rb={G.722}, R'a={AMR_WB} (maximum priority 2);
- second type: Rb={G.711}, R'a={G.711} (maximum priority 4);
- third type: Rb={G.711, G.722}, R'a={G711, AMR_WB} (maximum priorities 4 and 2);
- fourth type: Rb={G729, G.722}, R'a={G.711, AMR_WB} (maximum priorities 3 and 2);
- fifth type: Rb={AMR_WB, G.729}, R'a={AMR_WB, G.711} (maximum priorities 5 and 3); and
- sixth type: Rb={G.729}, R'a={G.711} (maximum priority 3).

Finally, during a step S'7, the transit device E obtains the revised response Ra at least from the provisional revised response R'a, and sends this revised response Ra to the terminal Ta.

For example, in a first variant, Ra is merely identical to R'a. In this first variant, depending on the type of the terminal Tb, the transit device E obtains:
- first type: Rb={G.722}, R'a={AMR_WB};
- second type: Rb={G.711}, R'a={G.711};
- third type: Rb={G.711, G.722}, R'a={G711, AMR_WB};
- fourth type: Rb={G729, G.722}, R'a={G.711, AMR_WB};
- fifth type: Rb={AMR_WB, G.729}, R'a={AMR_WB, G.711}; and
- sixth type: Rb={G.729}, R'a={G.711}.

In a second variant, R'a is filtered so as to retain only its first codec. In this second variant, depending on the type of the terminal Tb, the transit device E obtains:
- first type: Rb={G.722}, R'a={AMR_WB};
- second type: Rb={G.711}, R'a={G.711};
- third type: Rb={G.711, . . . }, R'a={G711};
- fourth type: Rb={G729, . . . }, R'a={G.711};
- fifth type: Rb={AMR_WB, . . . }, R'a={AMR_WB}; and
- sixth type: Rb={G.729}, R'a={G.711}.

Other variants are naturally possible.

It should be recalled that the initial offer from Ta was:

Oa={AMR_WB,G.711}

It can be seen in the above example that for a terminal Tb of the sixth type, G.711-G.729 (i.e. LD-LD) transcoding is favored over AMR_WB-G.729 (i.e. HD-LD) transcoding of the prior art.

The invention can be Implemented within nodes, e.g. transit devices, communications networks, by means of software and/or hardware components.

The software components may be integrated in a conventional program for network load management. That is why, as specified above, the present invention also provides a computer system. The computer system includes in conventional manner a central processor unit using signals to control a memory, and also an input unit and an output unit. Furthermore, the computer system may be used to execute a computer program including instructions for performing any one of the codec negotiation methods of the invention.

Specifically, the invention also provides a computer program that is downloadable from a communications network and that includes instructions for executing steps of a codec negotiation method of the invention when it is executed on a computer. The computer program may be stored on a computer readable medium and may be executable by a microprocessor.

The program may use any programming language, and be in the form of source code, object code, or code intermediate between source code and object code, such as in a partially complied form, or in any other desirable form.

The invention also provides a non-removable, or a partially or totally removable data medium that is readable by a computer and that includes instructions of a computer program as mentioned above.

The data medium may be any entity or device capable of storing the program. For example, the medium may comprise storage means such as a read only memory (ROM), e.g. a compact disk (CD) ROM or a microelectronic circuit ROM, or it may comprise magnetic storage means such as a hard disk, or even a universal serial bus (USB) flash drive.

Furthermore, the data medium may be a transmissicible medium such as an electrical or optical signal, suitable for being conveyed via an electrical or optical cable, by radio, or by other means. The computer program of the invention may in particular be downloaded from an Internet type network.

In a variant, the data medium may be an integrated circuit in which the program is incorporated, the circuit being adapted to execute or to be used in the execution of any of the codec negotiation methods of the invention.

The invention claimed is:

1. A codec negotiation method executed by a transit device situated on a signaling path between first and second IP domains/networks, the method comprising:
   intercepting an offer issued by a first terminal belonging to the first domain/network, the offer specifying, for a given type of media stream, a first list of codecs which the first terminal is capable of using for communicating with a second terminal belonging to a second domain/network;
   determining, using at least the offer, a revised offer comprising a second list of codecs;
   sending the revised offer to the second terminal;
   receiving a response from the second terminal, the response comprising a third list of n codecs Rb={Cb(1), Cb(2), . . . , Cb(n)}, n being an integer greater than or equal to 1, comprising a plurality of codecs that are contained in the revised offer and capable of being used by the second terminal;
   determining, using at least the response, a provisional revised response comprising a fourth list of codecs Ra'={Ca(1), Ca(2), . . . , CA(n)}, using a priority list accessible from the transit device, the priority list comprising triplets, each triplet including:
   a first codec Ca usable by a terminal of the first domain/network;
   a second codec Cb usable by a terminal of the second domain/network; and
   a degree of priority associated with the pair of codecs comprising the first codec Ca and the second codec Cb;
   wherein each of the codecs Ca(i), with i=1, . . . , n in the fourth list of codecs is a codec that, in association with the corresponding codec Cb(i) of the third list of codecs of the response, offers the highest degree of priority in the priority list from among the codecs of the offer.

2. A codec negotiation method according to claim 1, further comprising sending a revised response to the first terminal, the revised response comprising a fifth list of codecs, the fifth list of codecs comprising at least the provisional revised response, or the first codec of the provisional revised response.

3. A codec negotiation method according to claim 1, wherein determining a revised offer comprises:
   determining, for each codec of the offer, one or more codecs usable by a terminal of the second domain/network, and determining the degree of priority associated with the or each pair formed by the codecs of the offer and the or each codec usable by a terminal of the second domain/network;
   determining for each of the codecs usable by a terminal of the second domain/network, a maximum degree of priority from among the determined degrees of priority, and selecting this maximum degree of priority in association with the codec usable by a terminal of the second domain/network, and
   forming a revised offer comprising the codecs usable by a terminal of the second/domain network, ordered by decreasing values of the associated maximum degree of priority.

4. A codec negotiation method according to claim 1, characterized wherein the degrees of priority form a scale favoring high definition communications over low definition communications.

5. A codec negotiation method according to claim 1, wherein the priority list is selected by the transit device from a plurality of respective lists, each corresponding to a respective level for the current load of the transit device.

6. A transit device situated on a signaling path between a first IP domain/network and a second IP domain/network, the device configured to:
   intercept an offer issued by a first terminal belonging to said first domain/network, said offer specifying, for a given type of media stream, a first list of codecs, which the first terminal proposes using for communicating with a second terminal belonging to said second domain/network;
   determine, using the offer, a revised offer comprising a second list of codecs;
   send the revised offer to the second terminal;
   receive a response from the second terminal, the response including a third list of n codecs Rb={Cb(1), Cb(2), . . . , Cb(n)}, n being an integer greater than or equal to 1, that are contained in the revised offer and capable of being used by the second terminal; and determine, using at least the response, a provisional revised response including a fourth list of codecs Ra'={Ca(1), Ca(2), ..., CA(n)}, using a priority list accessible by the transit device, the priority list comprising triplets, each triplet including:
- a first codec Ca usable by a terminal of the first domain/network;
- a second codec Cb usable by a terminal of the second domain/network; and
- a degree of priority associated with the pair of codecs comprising the first codec Ca and the second codec Cb;

wherein each of the codecs Ca(i), with i=1, ..., n in the fourth list of codecs is a codec that, in association with the corresponding codec Cb(i) of the third list of codecs of the response, offers the highest degree of priority in the priority list from among the codecs of the offer.

7. A transit device according to claim 6, wherein the device is further configured to send a revised response to the first terminal, the revised response including a fifth list of codecs, the fifth list of codecs comprising at least the provisional revised response, or the first codec of the provisional revised response.

8. A transit device according to claim 6, the device further configured to:
- determine for each codec of the offer, the or each codec that is usable by a terminal of the second domain/network, and determine the degree of priority associated with the or each pair formed by the codecs of the offer and the or each codec usable by a terminal of the second domain;
- determine for each of the codecs usable by a terminal of the second domain/network, a maximum degree of priority from among the determined degrees of priority, and selecting this maximum degree of priority in association with the codec usable by a terminal of the second domain/network; and
- form a revised offer comprising the codecs usable by a terminal of the second/domain network ordered by decreasing value of the associated maximum degree of priority.

9. A transit device according to claim 6, wherein the degrees of priority form a scale favoring high definition communications over low definition communications.

10. A transit device according to claim 6, wherein the priority list comprises a plurality of respective priority lists each corresponding to a respective level for the current load of said transit device, and the device is further configured to:
- obtain its own load; and
- determine the range within which the obtained load lies from among a series of respective ranges each corresponding to a respective load level.

11. A non-transitory computer readable data medium having stored thereon instructions which, when executed by a processor, cause said processor to perform a codec selection method executed by a transit device situated on a signaling path between first and second IP domains/networks, the method comprising
intercepting an offer issued by a first terminal belonging to the first domain/network, the offer specifying, for a given type of media stream, a first list of codecs which the first terminal is capable of using for communicating with a second terminal belonging to a second domain/network;

determining, using at least the offer, a revised offer comprising a second list of codecs;

sending the revised offer to the second terminal;

receiving a response from the second terminal, the response comprising a third list of n codecs Rb={Cb(1), Cb(2), ..., Cb(n)}, n being an integer greater than or equal to 1, comprising a plurality of codecs that are contained in the revised offer and capable of being used by the second terminal;

determining, using at least the response, a provisional revised response comprising a fourth list of codecs Ra'={Ca(1), Ca(2), ..., CA(n)}, using a priority list accessible from the transit device, the priority list comprising triplets, each triplet including:
- a first codec Ca usable by a terminal of the first domain/network;
- a second codec Cb usable by a terminal of the second domain/network; and
- a degree of priority associated with the pair of codecs comprising the first codec Ca and the second codec Cb;

wherein each of the codecs Ca(i), with i=1, ..., n in the fourth list of codecs is a codec that, in association with the corresponding codec Cb(i) of the third list of codecs of the response, offers the highest degree of priority in the priority list from among the codecs of the offer.

12. A computer having stored thereon instructions which, when executed by the computer, cause the computer to perform a codecs selection method executed by a transit device situated on a signaling path between first and second IP domains/networks, the method comprising:
intercepting, by a transit device situated on a signaling path between first and second IP domains/networks, an offer issued by a first terminal belonging to the first domain/network, the offer specifying, for a given type of media stream, a first list of codecs which the first terminal is capable of using for communicating with a second terminal belonging to a second domain/network;

determining, using at least the offer, a revised offer comprising a second list of codecs;

determining, using at least the offer, a revised offer comprising a second list of codecs;

sending the revised offer to the second terminal;

receiving a response from the second terminal, the response comprising a third list of n codecs Rb={Cb(1), Cb(2), ..., Cb(n)}, n being an integer greater than or equal to 1, comprising a plurality of codecs that are contained in the revised offer and capable of being used by the second terminal;

determining, using at least the response, a provisional revised response comprising a fourth list of codecs Ra'={Ca(1), Ca(2), ..., CA(n)}, using a priority list accessible from the transit device, the priority list comprising triplets, each triplet including:
- a first codec Ca usable by a terminal of the first domain/network;
- a second codec Cb usable by a terminal of the second domain/network; and
- a degree of priority associated with the pair of codecs comprising the first codec Ca and the second codec Cb;

wherein each of the codecs Ca(i), with i=1, ..., n in the fourth list of codecs is a codec that, in association with the corresponding codec Cb(i) of the third list of codecs of the response, offers the highest degree of priority in the priority list from among the codecs of the offer.

* * * * *